United States Patent [19]

Pollerspöck

[11] 4,367,825

[45] Jan. 11, 1983

[54] PRESSURE-RESISTANT HOUSING HAVING A RECTANGULAR LID

[75] Inventor: Kurt Pollerspöck, Berlin, Fed. Rep. of Germany

[73] Assignee: Siemens Aktiengesellschaft, Munich, Fed. Rep. of Germany

[21] Appl. No.: 303,077

[22] Filed: Sep. 17, 1981

[30] Foreign Application Priority Data

Sep. 19, 1980 [DE] Fed. Rep. of Germany ....... 3035835

[51] Int. Cl.³ .............................................. B65D 43/20
[52] U.S. Cl. ..................................... 220/346; 220/315
[58] Field of Search ......................... 220/345, 346, 315

[56] References Cited

U.S. PATENT DOCUMENTS 3,339,785  9/1967  Nugent ........................... 220/346 X
3,352,446 11/1967  Anderson et al. ............... 220/346 X

FOREIGN PATENT DOCUMENTS 2243263  3/1974  Fed. Rep. of Germany .

Primary Examiner—George T. Hall
Attorney, Agent, or Firm—Kenyon & Kenyon

[57] ABSTRACT

Disclosed is a generally prismatic pressure-resistant housing for encapsulating electrical equipment in a flame-proof or explosion-proof manner. The housing has a generally rectangular opening and a lid of substantially rectangular shape. The lid when being closed or opened moves generally diagonally towards and away from the housing such that all four sides of the lid are simultaneously tightened or loosened, respectively. Structure for accomplishing this can comprise frames extending about the edges of the opening and the lid which include a flanged portion, a pair of locking channels extending about adjacent sides of the opening and meeting at a corner thereof and another pair of locking channels extending about adjacent sides of the lid and meeting at a corner thereof which is diagonally opposite the corner of the opening at which the locking channels meet. The locking channels extend over opposed flanged portions and engage the flanged portions in the locked condition of the lid.

10 Claims, 11 Drawing Figures

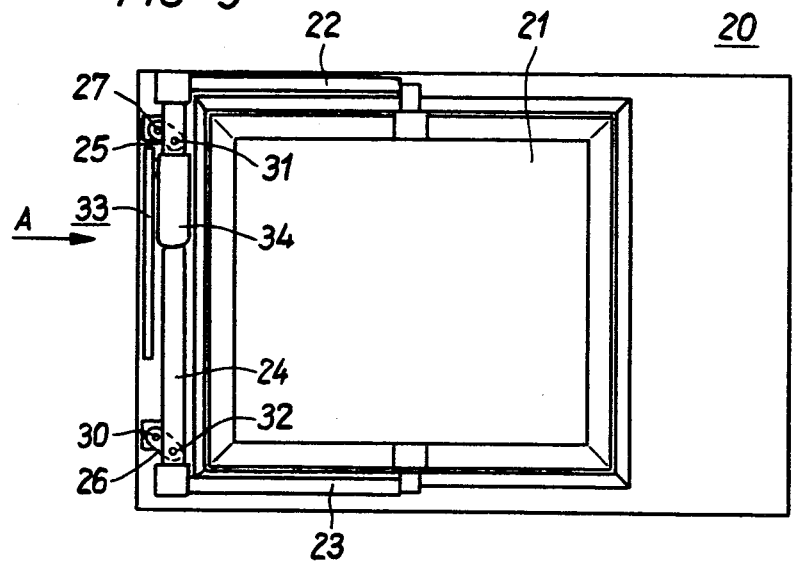
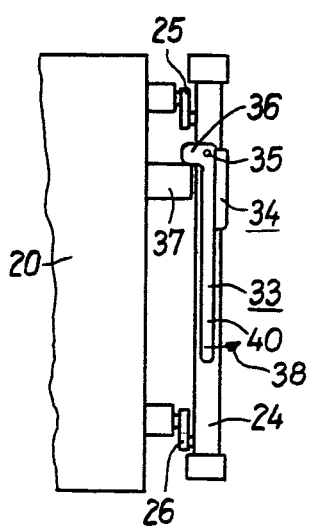
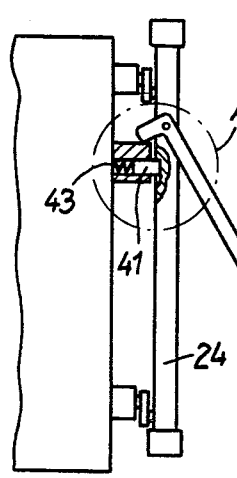
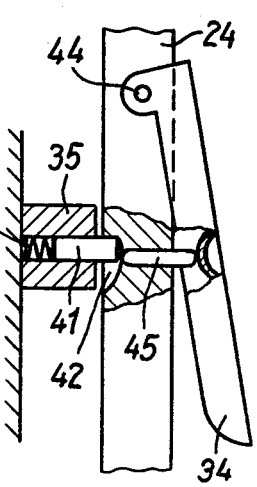

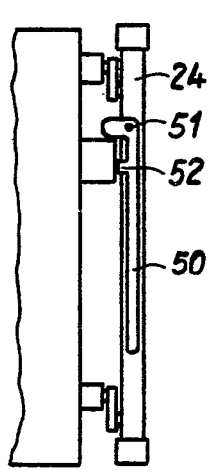
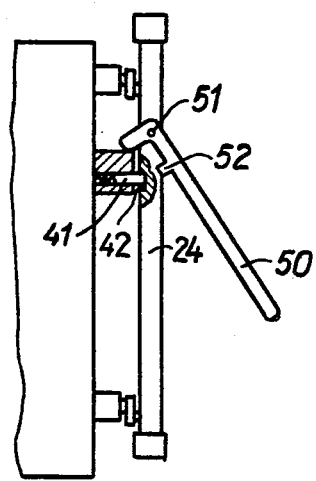
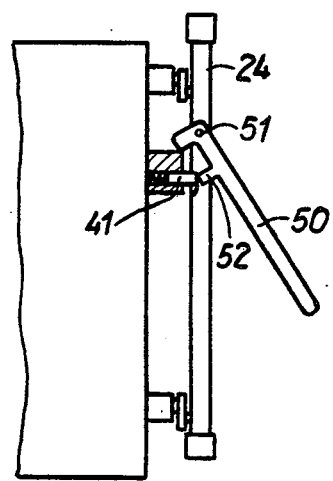
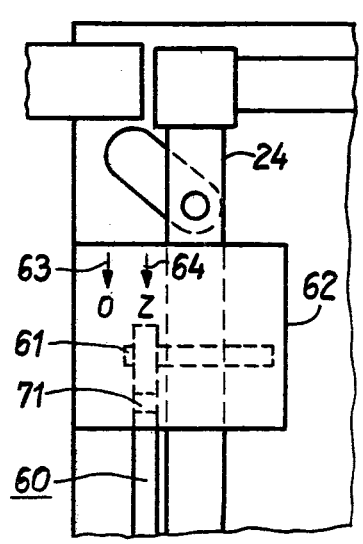
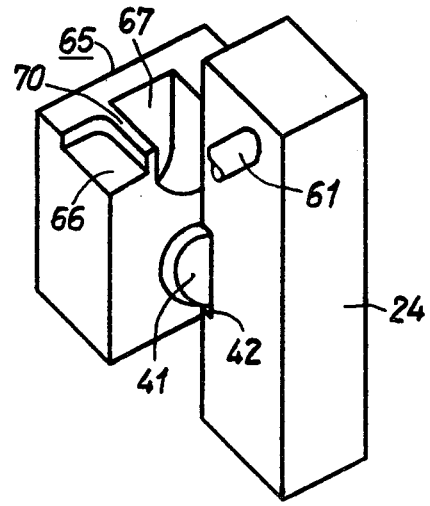

PRESSURE-RESISTANT HOUSING HAVING A RECTANGULAR LID

BACKGROUND OF THE INVENTION

The present invention relates to a pressure-resistant housing of generally prismatic shape for encapsulating electrical equipment in a flame-proof or explosion-proof manner.

A prismatic pressure-resistant housing is disclosed, for example, in DE-AS No. 2243263. As disclosed in that German patent publication, the lid for the housing is locked to the housing along a pair of opposite sides by means of continuous strips and on the other pair of opposite sides in bayonnet-fashion by a multiplicity of mutually engaging claws. To close and open the housing, the lid is shifted linearly along one of its edges.

OBJECTS AND SUMMARY OF THE INVENTION

It is an object of the present invention to provide an improved pressure-resistant housing.

It is another object of the present invention to provide a lid or closure for a prismatic pressure-resistant housing in which the lid and the housing opening have a similar shape and in which the lid is effectively locked to the housing along all four sides thereof.

These and other objects are achieved in accordance with the invention by providing a prismatic pressure-resistant housing having a generally rectangular opening, and a lid therefor which is movable diagonally relative to the opening of the housing when the lid is being locked to the housing or being loosened for removal from the housing. The diagonal movement of the lid enables the lid to be locked or loosened simultaneously along all four sides.

In accordance with one aspect of the invention, continuous closure elements can be used along all four sides of the lid and opening so that mechanical machining, heretofore necessary for the numerous lid claws and the housing of a prior art arrangement, can be eliminated.

In accordance with one aspect of the invention, a frame is provided which extends about the four side edges of the lid, i.e. extending generally about the perimeter of the lid, and a frame is provided which extends about the four side edges of the opening, i.e. generally extending about the perimeter of the opening. Each frame, which can be generally strip-like, includes a flanged portion. Locking channels are provided to engage opposed flange portions of the frames secured to the housing and to the lid in the locked condition of the lid. Two locking channels can be secured to the housing along one pair of adjacent side edges of the opening and two locking channels can be secured to the lid along a pair of adjacent side edges of the opening, the locking channels secured to the housing meeting at a corner of the opening and the locking channels secured to the lid meeting at the diagonally opposite corner of the lid. Opposed flanged portions of the frames secured to the housing and the lid can thereby be engaged by respective locking channels in the locked condition or position of the lid. The frame and the locking channels may be formed as one piece or they may comprise separate parts and be connected to the lid and the housing for example by welding or by other suitable fastening means.

It is to be noted that the particular ratio of adjacent sides of the rectangle which defines the shape of the lid and the opening is not critical and the ratio may be, for example, 1:1, i.e. a square.

In accordance with another aspect of the invention, the locking channels advantageously have a U-shaped cross section and extend over the flanged-portions of opposed frames secured to the lid and to the housing in the locked condition of the lid. In the event of an explosion in the interior of the pressure-resistant housing, the stress is substantially taken up by the U-shaped channel so that other connecting elements of the locking channel, the housing and the lid are not stressed.

The diagonal movement which the invention provides during opening and closing (locking) of the lid can be obtained in different ways. According to one aspect of the invention, this movement can be obtained by providing a support rod movably conneted to the housing along one side edge of the opening such that the support rod can be moved axially while at the same time being displaced laterally, e.g. a vertically disposed support rod can be raised while being moved laterally. Further description herein will be made with respect to a vertically disposed support rod. A swivel arm is connected to the support rod extending along a side edge of the opening adjacent to the one side edge, and another swivel arm is connected to the support rod extending along a further side edge of the opening adjacent to the one side edge. An operating lever is connected to support rod for lifting it while the arms engage the lid and move it upon movement of the support rod. The support rod can be connected to the housing by knuckle arms or levers which themselves are connected to the housing and the support rod to provide for the lateral movement of the support rod automatically without additional mechanisms.

The diagonal movement of the lid may occur along a straight line or along curved lines extending generally diagonally. The manner of connection of the support rod to the housing will determine the path that the lid follows. For example, depending on the form and arrangement of the knuckle arms, different generally diagonally paths can be obtained.

According to another aspect of the invention, the operating lever can be relieved of stress in the open condition or position of the lid by means of a resiliently-biased detent pin extending from the housing and received in and engaged by a recess in the lid. The detent pin can be moved against its resilient bias for disengaging the detent pin from the recess. As the lid is being opened, the resilient bias causes the detent pin to enter into the recess as soon as the lid has been shifted by an amount necessary for detaching it from the housing.

In accordance with another aspect of the invention, the operating lever can be pivotally supported by the support rod and include a lever arm or projection extending from an operating arm of the operating lever towards the housing. The housing includes an abutment which is positioned on the housing to cooperate with the projection for opening the lid. In opening the lid, the operating arm is pivoted so that the projection slidably engages the abutment to provide lateral sliding movement of the projection on the abutment. It has been found that such movement does not impair the opening process. By suitable selection of the length of the projection as compared to the length of the operating arm itself, i.e. the lever ratio, relatively heavy lids, which can weigh between about 100–200 kg, can be opened with moderate effort.

In accordance with another aspect of the invention, to facilitate closing the lid, a manually operable release lever can be mounted to the support rod which provides for shifting the detent pin against its resilient bias and frictional forces. Operation of the release lever to disengage the detent pin from the reces enables the lid to automatically move into its closed position under the influence of gravity. This provides a substantial improvement over known housings which can require considerable forces for closing, as well as for opening.

In accordance with still another aspect of the invention, instead of the release lever, the operating lever can be provided with another projection which extends opposite the detent pin in the raised (open) position of the operating lever corresponding to the open position of the lid. The projection contacts the detent pin and releases it from the recess upon pushing the operating lever down, i.e. towards the detent pin.

In accordance with still another aspect of the invention, means can be provided to prevent accidental release of the lid in the open position in which it is swung away from the housing. According to the invention, the operating lever can be mounted to move laterally towards and away from the housing and a stop can be provided on the housing to limit the amount of lateral movement. The stop causes the operating lever to remain stationary if the support rod is shifted laterally. The projection on the operating lever can only be brought into the vicinity of the detent pin for releasing it from the recess by a different operation, namely by manual movement of the operating lever in the direction of the support rod.

These and other objects, aspects, features and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 3 is a front view of the pressure-resistant housing with the lid held thereon showing parts for locking the lid onto the housing and for loosening and removing the lid;

FIGS. 4, 5 and 6 are side views of the housing and lid of FIGS. 1-3 showing an operating lever and a release lever arrangement for opening and closing the lid;

FIGS. 7, 8 and 9 are side views showing another embodiment of an operating lever and release lever arrangement;

FIG. 10 is an enlarged side view of a modification for the arrangement of FIGS. 7-9 for opening and closing the lid; and FIG. 11 is a perspective view of the modification of FIG. 10.

DESCRIPTION OF THE PREFERRED EMBODIMENTS

Figure 1:
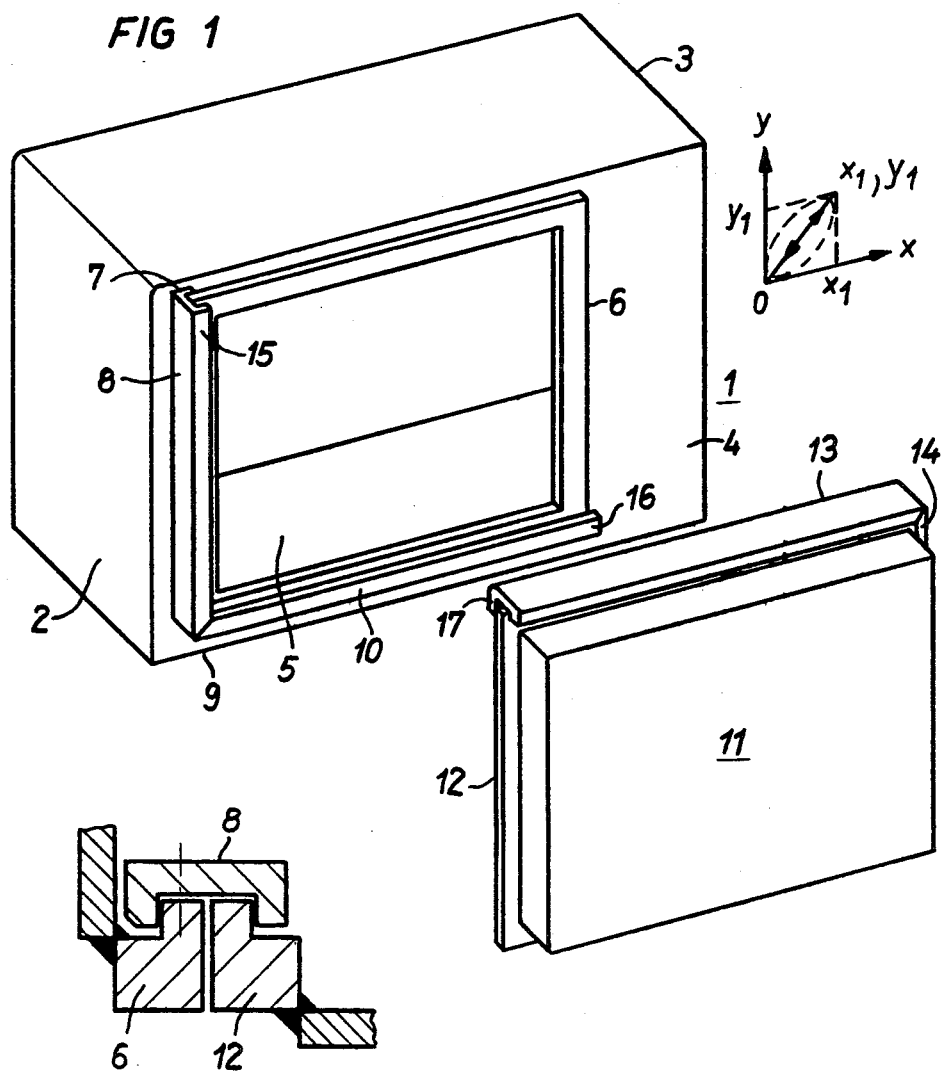
FIG. 1 is a perspective view of a pressure-resistant housing having a rectangular opening and including a rectangular lid for closing the opening.

Referring more particularly now to the drawings, a pressure-resistant housing including a lid or cover and means for locking the lid to the housing are illustrated. The pressure-resistant house can be used to house electric switchgear which, for example, is used in the operation of electric motor drives in underground mines. The pressure resistant housing 1 shown in FIG. 1 is of substantially prismatic configuration. For clarity, not shown are the junction boxes required for the construction of a complete switching system or distribution center customarily associated with the side walls 2 and 3 of the housing as well as equipment installed in the housing and runners and other accessories required for the installation. A pressure-resistant housing with associated switchgear, junction boxes and runners is shown, for example, in DE-AS No. 26 29 226.

Figure 2:
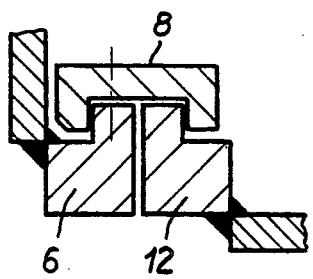
FIG. 2 is a section view taken through the lid and the housing of FIG. 1 at the edge or rim of the opening.

Referring to FIG. 1, the pressure-resistant housing 1, which can preferably be of welded construction, has at its front 4 a rectangular opening 5 which provides access to the interior of the housing for installing and servicing equipment in the housing. The opening 5 is surrounded by a strip-like frame 6 of generally rectangular cross section secured to the housing. The frame includes a flanged portion as shown in FIG. 2. A space is provided between the inside of the frame 6 and the front wall 4 of the housing 1 in which one leg 7 of a locking channel 8 of U-shaped cross section is received. The locking channel 8 is rigidly fastened along one side or edge of the frame in that position by screws or other suitable means. A further locking channel 10 similar to the locking channel 8 is fastened to the frame 6 at a right angle to the locking channel, i.e. along the adjacent side edge of the opening 5. As shown in FIG. 1, the locking channels 8 and 10 are positioned along the left and lower edges of the opening 5 and therefore extend parallel to the side wall 2 and the lower wall 9 of the housing 1, respectively.

Still referring to FIG. 1, a lid 11 of substantially rectangular shape has secured about its edge on the side facing the opening 5 a strip-like frame 12 of generally rectangular cross-section similar to the frame 6 secured to the housing. Frame 12 also includes a flanged portion. Locking channels 13 and 14 are rigidly connected to the lid extending over the frame 12 at the top and right side (with reference to FIG. 1), respectively, of the lid. As shown in the section in FIG. 2 taken through the lid and the housing of FIG. 1 in the vicinity of the edge or rim of the opening 5, the locking channel 8 extends over the flanged portions of opposed frames 6 and 12 of the housing 1 and the lid 11. Fastening means, indicated by a dash-dotted line in FIG. 2, by which the locking channels are fastened to the frames, are subjected to only a small stress since the main load which occurs in the interior of the housing in the event of an explosion is taken up by the locking channels themselves. Therefore, the locking channels, which have a U-shaped cross section, are superior in performance to channels which have a right-angle profile, and also require less effort to connect them to the frame.

Locking channels of U-shaped cross section also advantageously maintain a protective gap between frames 6 and 12, which, according to regulations for the protective class entitled "pressure-resistant encapsulation" must not be more than 0.4 mm in the closed condition of the housing.

By attaching the locking channels 8 and 10, and 13 and 14 such that they start from diagonally opposite corners of the opening 5 and the lid 11, surprisingly, the lid can be joined to or detached from the housing simultaneously on all four sides even though continuous closure elements are used.

A coordinate system having X and Y axes as shown in FIG. 1 can be used to illustrate the motion required for locking or detaching the lid. The X and Y axes correspond to the planes in which, respectively, the side walls 2 and 3, and the lower wall 9 and the opposite upper wall of the housing 1 extend. The lid 11 is located in its closed position after it has been brought into a position parallel to the front wall 4 of the housing 1, starting from a point $x_1$, $y_1$, by diagonally shifting the lid into the origin O of the coordinate system. The distances $x_1$ and $y_1$ correspond at least to the depth of the U-section of the locking channels 8 and 10 at the opening 5, as well as to the depth of the corresponding locking channels 13 and 14 of the lid 11, which for example, can be from about 6 mm to about 10 mm. Movement of the lid does not have to be precisely diagonally to the origin, i.e. along a straight diagonal line, but can be along curved lines extending generally diagonally from the point $x_1$, $y_1$ to the origin. Therefore, the lid can be shifted in increments first along the x-axis and then along the y-axis to approximate the curved lines.

A support for the lid 11 and for opening and the closing the lid is shown in FIGS. 3 to 6. The pressure-resistant housing 20 in FIG. 3 includes a lid 21 of generally rectangular shape which is held along opposed (e.g. horizontal) edges thereof by swivel arms 22 and 23 hinged at their ends to a common (e.g. vertical) support rod 24. Hinged or swivel joints are also provided to connect the support arms 22 and 23 to the lid 21 so that the lid 21 can be swung away from the housing in a space-saving manner in a position parallel to the front side thereof. The support rod 24 is connected to the pressure-resistant housing by means of two knuckle levers or arms 25 and 26, which in the closed position of the lid 21 extend downwardly at an angle of about 45°. The knuckle levers are pivotally connected to the housing by pivots 27 and 30 and pivotally connected to the support rod 24 by pivots 31 and 32, respectively. Since the pivots 27 and 30 of the knuckle levers 25 and 26, respectively, are located on the side of the support rod 24 facing away from the lid 21 and above the pivot points 31 and 32, the lid 21 is automatically shifted to the right and up to the open position when the support rod 24 is lifted up, and automatically shifted to the left and down when going from the open position to the closed position. In this manner, the composite motion for opening and closing the lid described in connection with FIG. 1 is obtained.

An operating lever 33 and a release lever 34 are provided for opening and closing the lid which are shown in a front view in FIG. 3 and in side views in FIGS. 4-6. The operating lever 33 is provided as an angle lever, the fulcrum 35 of which is provided at the support rod 24. The short lever arm or projection 36 of the operating lever 33 rests against a stop or abutment 37 fastened to the housing 20, while the longer arm or operating lever 40 extends vertically, i.e. approximately parallel to the support rod 24 in the closed position of the lid 21, as shown in FIG. 4. By raising the operating lever 33 in the direction of the arrow 38, as shown in FIG. 5, the support rod 24 with the swivel arms 22 and 23 linked thereto are raised, and thereby the lid 21 is also raised. This motion results in a lateral shift of the lid 21 corresponding to the swing of the knuckle levers 25 and 26 about their pivots 27 and 30 on the housing side. At the end of the lifting stroke for opening the lid 21, a detent pin 41 (FIGS. 5 and 6), movably supported against the force of a compression spring 43 in a bore or hole in the stop 37, enters a recess 42 in the support rod 24. The lid 21 can then be swung away from the opening of the housing. The detent pin 41 can be accommodated in the support rod 24 instead of in the hole in stop 37.

To close the lid 21, it is first swung back in front of the opening of the housing 20. Then, the release lever 34, shown enlarged in FIG. 6, which is fulcrummed at the support rod 24 by means of a fulcrum pin 44, is pressed down. A transmission pin 45 pushes back the detent pin 41 against the action of the spring 43 so that the detent pin comes out of engagement with the recess 42 of the support rod 24. The support rod 24 is then released and the entire movable arrangement of the lid, swivel arms and support rod is automatically brought into the closed position under the influence of gravity.

Another embodiment of an operating lever is shown in FIGS. 7-9 which allows opening and closing of the lid by means of a single mechanism, i.e. the release lever 34 described above can be eliminated. To this end, the operating lever 50 in FIG. 7 has below its fulcrum 51 secured to the support rod 24, a projection 52 which, in the open position of the lid, is opposite the detent pin 41 (FIG. 8). The operating lever 50 otherwise corresponds to the operating lever 33 described in connection with FIGS. 3 to 5. By pushing down the operating lever 50 in the open position of the lid (FIG. 9), the detent pin 41 is displaced from the recess in the support rod 24 by the projection 52, so that the support rod is released and the lid automatically moves into its closed position. The arrangement of the detent pin 41 and the recess 42 requires that part of the detent pin 41 protrudes to the edge of the support rod 24.

Unintended lowering of the support rod 24 can be prevented by providing the arrangement shown in FIGS. 10-11 in the lever embodiment of FIGS. 7-9. To this end, the operating lever 60 in FIG. 10 is arranged on a projecting fulcrum pin 61 which is movable relative to the support rod 24 so that the operating lever can assume different positions by parallel displacement thereof in opening and closing the lid. These positions are indicated by arrow 63 for opening and arrow 65 for closing the lid.

Lateral displacement of the operating lever 60 is limited by the lock or stop or abutment 65 (FIG. 11) located behind a protective shield 62 (FIG. 10) fastened to the support rod 23. A recess 66, which is separated from an adjoining further recess 67 by a web 70, is provided as a stop on the top side of the abutment 65. The shorter lever arm of the operating lever 60 enters the recess 66 as the lid of the pressure-resistant housing is being opened and a lateral displacement and lifting of the support rod 24 occurs. The operating lever cannot move laterally, however, due to the web 70 in the abutment 65 fixed to the housing. This prevents the operating lever from following. When the support rod 24 has reached its end position, the detent pin 41 enters the corresponding recess 42 in the support rod 24 and thereby relieves the force on the operating lever 60. Upon being released, the operating lever returns into its starting position. When the operating lever 60 is pushed down, the lid of the housing cannot be closed, as opposed to the arrangement of FIGS. 7 to 9, because the projection 52 does not meet the detent pin 41. The lid can be closed only after the operating lever 60 has been brought by lateral displacement into the position indicated by arrow 64, and its projection comes into contact with the detent pin 41. As mentioned, the recess 66 receives the shorter lever arm of the operating lever.

In all the embodiments described and illustrated, the lid of the pressure-resistant housing is closed by the influence of gravity after a detent pin is released. Because the weight of the lid is considerable, a secure closure is ensured.

It is to be understood that it is also possible to open the lid by a downward displacement in conjunction with a logically reversed arrangement of the locking channels and the knuckle levers.

The advantages of the present invention, as well as certain changes and modifications of the disclosed embodiments thereof, will be readily appaent to those skilled in the art. It is the applicant's intention to cover by his claims all those changes and modifications which could be made to the embodiments of the invention herein chosen for the purposes of the disclosure without departing from the spirit and scope of the invention.

What is claimed is:

1. A pressure-resistant housing of substantially prismatic configuration having a generaly rectangular opening, and comprising a lid of substantially rectangular shape and means for locking the lid adjacent to the opening to close the opening, said means being operative to generally diagonally move the lid towards the opening and lock the lid to the housing simultaneously at the four sides of the lid.

2. The pressure-resistant housing according to claim 1, wherein said means comprise a frame extending generally about the perimeter of the opening and a frame extending generally about the perimeter of the lid, each said frame being strip-like and having a flanged portion, said means further comprising two locking channels secured to the housing along adjacent edges of the opening and two locking channels secured to the lid along adjacent edges of the lid, the locking channels secured to the housing meeting at a corner of the opening and the locking channels secured to the lid meeting at a corner of the lid which is diagonally opposite the corner of the opening at which the locking channels secured to the housing meet, opposed flanged portions of the frames secured to the housing and to the lid being engaged by a respective locking channel in the locked condition of the lid.

3. The pressure-resistant housing according to claim 2 wherein the locking channels are of U-shaped cross-section, a respective channel in the closed condition of the lid extending adjacent to a respective flanged portion of the frames secured to the housing and to the lid.

4. The pressure-resistant housing according to claim 1, 2 or 3, wherein said means include a support rod movably connected to the housing along one edge of the opening such that the support rod can be moved axially while at the same time being displaced laterally, an arm connected to the support rod and extending along another edge of the opening adjacent to the one edge, another arm connected to the support rod and extending along a further edge of the opening opposite said other edge, and an operating lever connected to the support rod for axially moving it, the arms engaging the lid and moving it upon movement of the support rod.

5. The pressure-resistant housing according to claim 4, wherein said means include knuckle levers for movably connecting the support rod to the housing.

6. The pressure-resistant housing according to claim 5, wherein the support rod has a recess therein, a detent pin being provided extending from the housing opposite to the recess and means for resiliently biasing the detent pin towards the recess to be engaged by the recess.

7. The pressure-resistant housing according to claim 4, wherein the operating lever is pivotally supported by the support rod and includes a projection extending therefrom towards the support rod, the housing including an abutment positioned to cooperate with the operating lever projection to raise the operating lever and support rod relative to the housing upon pivoting of the operating lever.

8. The pressure-resistant housing according to claim 6, and comprising a release lever pivotally connected to the operating lever positioned to engage the detent pin and move it against the means for biasing out of engagement with the recess upon pivoting of the release lever.

9. The pressure-resistant housing according to claim 6, wherein a projection is provided extending from the operating lever which is disposed to engage the detent pin and move it against the means for biasing out of engagement with the recess upon pivoting of the operating lever to close the lid.

10. The pressure-resistant housing according to claim 7, and comprising a support for the operating lever which is movably mounted to the support rod so that the operating lever can be moved laterally relative to the support rod during opening and closing of the lid, and an abutment secured to the housing which includes a stop for limiting the amount by which the lever can laterally be moved relative to the support rod when the lid is opened.

* * * * *